US012236680B2

(12) United States Patent
Yang et al.

(10) Patent No.: US 12,236,680 B2
(45) Date of Patent: Feb. 25, 2025

(54) APPLICATION FOR ASSISTING A HEARING DEVICE WEARER

(71) Applicant: GN HEARING A/S, Ballerup (DK)

(72) Inventors: Qi Yang, Chicago, IL (US); Gregory B. Olsen, Lombard, IL (US); Jeffrey Todd Schlensker, Chicago, IL (US); Viktor A. Mateevitsi, Chicago, IL (US)

(73) Assignee: GN HEARING A/S, Ballerup (DK)

( * ) Notice: Subject to any disclaimer, the term of this patent is extended or adjusted under 35 U.S.C. 154(b) by 50 days.

(21) Appl. No.: 16/577,415

(22) Filed: Sep. 20, 2019

(65) Prior Publication Data

US 2021/0089773 A1    Mar. 25, 2021

(51) Int. Cl.
  *G06V 20/20*    (2022.01)
  *H04N 23/611*   (2023.01)
  *H04N 23/63*    (2023.01)
  *H04R 25/00*    (2006.01)

(52) U.S. Cl.
  CPC ........... *G06V 20/20* (2022.01); *H04N 23/611* (2023.01); *H04N 23/63* (2023.01); *H04R 25/70* (2013.01)

(58) Field of Classification Search
  CPC ............................................ H04R 1/1008–105
  See application file for complete search history.

(56) References Cited

U.S. PATENT DOCUMENTS

| | | | | |
|---|---|---|---|---|
| 5,870,481 A | * | 2/1999 | Dymond | H04R 25/70 381/313 |
| 10,110,983 B2 | * | 10/2018 | Burgett | A61B 5/1079 |
| 2006/0204013 A1 | * | 9/2006 | Hannibal | H04R 25/70 381/60 |
| 2008/0232618 A1 | * | 9/2008 | Johannesson | H04R 25/652 381/312 |
| 2009/0161963 A1 | * | 6/2009 | Uusitalo | G06F 16/748 382/181 |
| 2010/0268085 A1 | * | 10/2010 | Kruecker | A61B 8/4263 600/443 |

(Continued)

FOREIGN PATENT DOCUMENTS

| | | |
|---|---|---|
| CN | 104936118 | 9/2015 |
| CN | 109391890 | 2/2019 |

(Continued)

OTHER PUBLICATIONS

Extended European Search Report dated Mar. 19, 2020 for EP Appln. No. 19210247.3.

(Continued)

*Primary Examiner* — Frank Johnson
(74) *Attorney, Agent, or Firm* — Vista IP Law Group, LLP

(57) ABSTRACT

A digital assistance for assisting a wearer of a hearing device to correctly arrange the hearing device with respect to an ear of the wearer, includes: a control configured to enable a preview of a first image to be displayed, wherein the first image is generated by a camera; wherein the control is also configured to enable a capturing of the first image, the first image showing at least the ear of the wearer with the hearing device arranged in and/or at the ear of the wearer; and wherein the digital assistance also comprises a comparator configured to perform a comparison between (1) the first image showing the at least the ear of the wearer with the hearing device and (2) a reference image.

32 Claims, 5 Drawing Sheets

(56) References Cited

U.S. PATENT DOCUMENTS

| | | | | |
|---|---|---|---|---|
| 2011/0164128 A1* | 7/2011 | Burgett | | A61B 5/1076 |
| | | | | 348/77 |
| 2013/0169779 A1* | 7/2013 | Pedersen | | H04R 25/70 |
| | | | | 348/E7.085 |
| 2015/0146042 A1* | 5/2015 | Panek-Rickerson | | ............ |
| | | | | H04N 5/2356 |
| | | | | 348/239 |
| 2015/0264491 A1* | 9/2015 | Hauschultz | | H04R 1/10 |
| | | | | 381/329 |
| 2015/0382123 A1* | 12/2015 | Jobani | | H04R 1/1016 |
| | | | | 700/98 |
| 2016/0094899 A1* | 3/2016 | Aumer | | A61B 5/6802 |
| | | | | 340/870.07 |
| 2016/0135719 A1* | 5/2016 | von Kraus | | A61B 90/36 |
| | | | | 600/559 |
| 2017/0013117 A1* | 1/2017 | Deleuze | | G06V 40/165 |
| 2017/0113057 A1* | 4/2017 | Goodall | | A61N 1/36031 |
| 2017/0310886 A1* | 10/2017 | Hurst | | H04N 5/23206 |
| 2017/0332186 A1* | 11/2017 | Riggs | | H04S 7/301 |
| 2019/0046794 A1* | 2/2019 | Goodall | | A61N 1/36014 |
| 2019/0261096 A1* | 8/2019 | Aschoff | | H04R 25/505 |
| 2020/0074662 A1* | 3/2020 | Williams | | H04R 1/1016 |
| 2020/0342206 A1* | 10/2020 | Jobin | | G06T 7/70 |
| 2020/0389743 A1* | 12/2020 | Li | | G06T 7/60 |
| 2022/0386048 A1* | 12/2022 | Griffin | | H04R 25/30 |

FOREIGN PATENT DOCUMENTS

| | | |
|---|---|---|
| EP | 1703770 A1 | 9/2006 |
| EP | 1729231 A1 | 12/2006 |
| EP | 2922312 A1 | 9/2015 |
| EP | 3435689 | 1/2019 |
| EP | 3435689 A1 | 1/2019 |

OTHER PUBLICATIONS

Foreign Exam Report for EP Patent Appln. No. 19210247.3 dated Jan. 24, 2023.
Anonymous: "Camera phone—Wikipedia", Jan. 4, 2018 (Jan. 4, 2018), XP055809224,Retrieved from the Internet: URL:https://en.wikipedia.org/wlindex.php?title=Camera_phone&oldid=818557235 [retrieved on May 31, 2021].
Foreign OA for CN Patent Appln. No. 202010984375.1 dated Jul. 15, 2023.
English translation for foreign OA for Chinese Patent Application No. 202010984375.1 dated Jul. 15, 2023.
Foreign OA for Chinese Patent Application No. 202010984375.1 dated Dec. 20, 2023.

* cited by examiner

APPLICATION FOR ASSISTING A HEARING DEVICE WEARER

FIELD

The present disclosure relates to an application for assisting a wearer of a hearing device in correctly arranging the hearing device in and/or at an ear of the wearer. The application is to be executed by an electronic device having a camera.

BACKGROUND

Persons with various degrees of hearing loss or impaired hearing, may wear a hearing device to improve hearing. Hearing device settings are flexible, comprehensive and complex. Thus, good settings are highly personalized and may be hard to achieve. The settings are identified during a fitting session where a hearing care professional (HCP) adjusts the hearing device to the liking of the wearer of the hearing device.

Good settings are desired as less than optimal settings may result in poor performance of the hearing device and subsequently a bad experience for the hearing device wearer.

The arrangement of the hearing device in and/or at the ear of the wearer of the hearing device will influence the performance of the hearing device.

Thus, for the hearing device to have the best possible performance, the hearing device should be arranged correctly in and/or at the ear of the hearing device wearer. This presents a challenge for the wearer of the hearing device because it is difficult to achieve a correct arrangement of the hearing device in and/or at the ear of the wearer himself/herself without any assistance to guide the wearer. This is particularly so for new users, who are inexperienced in arranging their hearing device correctly. It is a problem that some hearing device wearers experience bad performance of the hearing device, where the bad performance is not due to the performance of the hearing device components as such but due to an incorrect arrangement of the hearing device in and/or at the ear of the wearer.

There is a need for providing assistance to a wearer of a hearing device for correctly arranging the hearing device in and/or at the ear of the wearer.

SUMMARY

Disclosed is an application to be executed by an electronic device having a camera. The application is for assisting a wearer of a hearing device in correctly arranging the hearing device in and/or at an ear of the wearer. The application is configured for receiving a first input for initiating the application to provide assistance to the wearer in correctly arranging the hearing device in and/or at the ear of the wearer. The application is configured for providing access to a camera application associated with the camera of the electronic device. The application is configured for enabling a viewfinder of the camera application to provide a preview of a first image. As used in this specification, a "preview" of an image refers to an image that has not yet been captured, e.g., a live image that has not been captured and converted into a static image. The application is configured for capturing the first image with the camera, the first image showing at least the ear of the wearer with the hearing device arranged in and/or at the ear. The application is configured for enabling a comparison between the first image and a reference image, and optionally providing recommendations for correct arrangement. The comparison is of a first, current or actual position of the hearing device arranged in and/or at the ear of the wearer in the first image relative to a reference position of the hearing device arranged in and/or at the ear of the wearer in the reference image.

As used in this specification, the term "image" may refer to a displayed image and/or to an image that is in electronic form that is not displayed.

The application as disclosed provides the advantage that it provides assistance to a wearer of a hearing device for correctly arranging the hearing device in and/or at the ear of the wearer. It is an advantage that the application may prevent a wrong, unsatisfactory, bad or incorrect arrangement of the hearing device in and/or at the ear of the wearer, which is difficult to detect without a visual reference.

Correct arrangement of the hearing device in and/or at an ear of the wearer is according or relative to a reference position, such as a reference arrangement. Thus, the reference image shows the reference position of the hearing device arranged in and/or at the ear of the wearer. The reference position may be defined or determined by for example a hearing care professional (HCP), such as a doctor, such as an audiologist or another specialist. The reference positon may be defined or determined during an initial fitting session, or the reference position may be defined or determined during a follow up session with a HCP. The reference position may be defined or determined at any time. The reference position may be defined or determined automatically by any kind of tool or apparatus. The reference position may be defined or determined manually by a HCP without using any kind of tool or apparatus or it may be defined or determined by a HCP using a tool or apparatus. The reference position may be a position for an optimal position, such as arrangement, of the hearing device in and/or at an ear of the wearer in relation to hearing device performance. Thus, the reference position may be a best, ideal or prime position or arrangement of the hearing device in and/or at an ear of the wearer for the hearing device to provide the best possible performance when in operation, such as when used. The reference position may be the position for the best fit of the hearing device arranged in and/or at the ear of the wearer. The reference position may be a position in which a HCP has performed, identified or adjusted the settings for the hearing device. The reference position may be a position that a HCP has defined or determined without performing any settings or tests. The reference position may be defined or determined by a person other than a HCP, such as the hearing device wearer himself/herself, or a family member or a friend helping the hearing device wearer.

It is an advantage of the application as disclosed that by providing assistance to a wearer of a hearing device in correctly arranging the hearing device in and/or at the ear of the wearer, the hearing device may perform to the best of its capabilities, such as the hearing device may provide the best possible performance, e.g. the best possible sound quality, noise reduction, occlusion management, microphone directionality, etc. It is an advantage that the application may enable the hearing device wearer to change the arrangement of the hearing device in and/or at the ear until a satisfactory result or performance has been achieved. It is an advantage that the application provides that the hearing device wearer obtains the best possible performance of the hearing device, by providing that the hearing device is arranged such as the HCP intended the hearing device to be worn, such as in the same position or arrangement as the hearing device was arranged when the HCP performed or identified the settings of the hearing device.

The correct arrangement of the hearing device may be at the exact reference position, such as reference arrangement, as defined or determined by the HCP or it may be close to the exact reference position or arrangement as defined or determined by the HCP, such as within close proximity of the exact reference position or arrangement, such as within a threshold of uncertainty of measurements of the reference position or arrangement. It is an advantage that although the wearer might not achieve or obtain a correct arrangement of the hearing device at the exact reference position, and thus might not achieve or obtain the best possible performance of the hearing device, the wearer may still experience an improved or acceptable performance of hearing device. It is an advantage that the application may provide at least an improved performance of the hearing device compared to a situation where the hearing device is arranged in and/or at the ear of the wearer without assistance from the application.

It is an advantage that the wearer of the hearing device may use the application several times in a row, thus the wearer may use the application to reiterate the process, procedure or flow of the application for arranging the hearing device. It is an advantage that the wearer of a hearing device may adjust the arrangement of the hearing device in incremental steps, where each step may improve the arrangement of the hearing device in and/or at the ear as compared to the reference position of the hearing device as defined or determined by the HCP.

Some hearing device wearers may need to use hearing devices for both ears, such as both left and right ear. It is a further advantage that the wearer may be assisted in using the correct hearing device for a given ear, such as assistance for arranging the hearing device intended for the right ear in and/or at the right ear, and assistance for arranging the hearing device intended for the left ear in and/or at the left ear.

It is an advantage that the hearing device wearer receives assistance from the application for correctly arranging the hearing device in and/or at an ear of the wearer without the need to consult a HCP. Thus, it is an advantage that the hearing device wearer may use the application anywhere at any time, and may thus achieve or obtain good, or at least an improved, performance of the hearing device.

A person other that the hearing device wearer may assist the hearing device wearer in using the application. A person other than the hearing device wearer may use one or more functionalities of the application. Thus, the user of the application may be the hearing device wearer, a HCP, or another person, such as a family member or a friend.

The application is to be executed by an electronic device having a camera. The application or app or application program or software application may be a computer program or computer software designed to be executed by an electronic device. The application may be designed or configured to provide functionalities for assisting a wearer of a hearing device in correctly arranging the hearing device in and/or at an ear of the wearer. The application may be available in versions for different platforms or operating systems, e.g. Android (Google) or iOS (Apple). The application may be installed on the electronic device by various means. For example, the application may be downloaded onto the electronic device from an application distribution platform that is operated by an owner of an operating system, such as the App Store (iOS/Apple) or Google Play Store (Android/Google). The application may be a stand-alone application with the sole purpose to assist a wearer of a hearing device in correctly arranging the hearing device in and/or at an ear of the wearer. Alternatively, the application may provide additional functionalities, such as adjustment of hearing parameters or modes, which may be related to the sound or audio of hearing device. A user of the application may go through the entire flow of functionalities as described below, or the user may choose to use just one functionality of the application.

The application is configured to be executed by an electronic device having a camera, such as an electronic device having a built-in camera. The electronic device may be the hearing device wearer's smart phone, tablet or pc. The electronic device may communicate with the hearing device via a wire or via a wireless connection, for example Bluetooth (BT), Wi-Fi, WLAN or any other wireless communication technology standards as known to a person skilled in the art for exchanging data over short distances. The electronic device may have a screen, such as a touch screen, touch-sensitive screen, a display screen, etc.

The camera may be any kind of camera provided in an electronic device, such as any kind of built-in or add-on peripheral camera of an electronic device. The camera may comprise one or more cameras, such as a front or front-facing camera and/or a rear or rear-facing camera. The camera may be a digital camera, a Red Green Blue (RGB) camera, an Infra-red (IR) camera, a depth camera or the camera may be a camera providing any kind of 3D scanning or sensing technology. The camera may comprise one or more sensors and/or detectors, such as Complementary metal-oxide-semiconductor (CMOS) image sensors, such as charge-coupled-device (CCD) image sensor. The camera may comprise a lens, such as a double Gauss lens, such as a Cooke triplet lens, such as a moulded plastic aspheric lens element. The camera may provide any kind of effect, such as different optical effects, such as distortion, such as vignetting, and/or such as various optical aberration corrections. The camera may have one or more zoom features, such as a digital zoom feature and/or an optical zoom feature.

The application is configured for receiving a first input for initiating the application to provide assistance to the wearer in correctly arranging the hearing device in and/or at the ear of the wearer. The first input may be a user input, such as a user providing the first input to the application. The user may provide the first input via an input device, such as a touch-sensitive surface or a keyboard. The first input may be a contact or a gesture on a touch-sensitive surface, such as a stylus and/or finger contact and/or gesture on a touch-sensitive surface. For example, the first input may be a tapping or swiping contact and/or gesture on a touch-sensitive surface. The first input may be a voice input, such as a human language voice input, such as a vocal or spoken input.

The application is configured for providing access to the camera application associated with the camera of the electronic device. The camera application associated with the camera may be pre-installed on the electronic device or it may be installed at any time.

The application is configured for enabling a viewfinder of the camera application to provide a preview of a first image. The viewfinder of the camera application may be provided on a screen of the electronic device, such as on a touch screen, such as on a display screen. The viewfinder of the camera application provides a preview of a first image. A preview of a first image may provide a means of previewing framing and other exposure before capturing an image, such as the first image. Thus, a preview may be generated by means of continuously and directly projecting an image formed by a lens of the camera onto an image sensor of the camera, which in turn feeds the screen of the electronic device with a live preview image or live image feed of an image, such as a first image. Thus, a preview of the first image, such as a live preview image or live image feed of the first image may be provided to the user before capturing the first image, such as to show or display what the first image will look like before the first image is captured.

The hearing device may be a hearing aid or a cochlear device. Throughout this application the term hearing aid is to be understood as an electronic device usually worn in and/or behind the ear of a user, comprising a microphone for providing a microphone signal and a signal processor for amplifying said microphone signal to compensate for a hearing-impairment of the user.

The hearing device may comprise a processing unit configured to receive an input signal and provide a processed output signal for compensating a hearing loss of a wearer, for example the hearing loss may be in certain frequency ranges. The hearing device may be any hearing device, such as any hearing device compensating a hearing loss of a wearer of the hearing device, or such as any hearing device providing sound to a wearer. The person skilled in the art is well aware of different kinds of hearing devices and of different options for arranging the hearing device in and/or at the ear of the hearing device wearer.

For example, the hearing device may be a behind-the-ear (BTE) hearing aid, in which a behind-the-ear module comprises the hearing device components provided as an assembly and mounted in a housing being configured to be worn behind the ear of a wearer in the operational position. Typically, a sound tube extends from the hearing device housing to the ear canal of the wearer.

For example, the hearing device may be a receiver-in-the-ear type hearing aid, in which a receiver is positioned in the ear, such as in the ear canal, of a wearer during use, for example as part of an in-the-ear module, while other hearing device components, such as the processor, the wireless communication unit, the battery, etc. are provided as a behind-the-ear module. Typically, a wired tube connects the in-the-ear module and the behind-the-ear module. It should be envisaged that the tube module comprising the tube, may comprise further hearing instrument components and connectors.

For example, the hearing device may be an in-the-ear or completely-in-the-canal type hearing aid in which the hearing device is provided in the ear of a wearer. Thus, an in-the-ear module comprises the hearing device components, including the processor, the wireless communication unit, the battery, the microphone and speaker, etc. The in-the-ear module may have one or more parts extending into the ear canal. The in-the-ear module may thus be configured to be positioned in the ear and in the ear canal.

For example, the hearing device may be an over-the-counter (OTC) hearing aid. OTC hearing aids may be of any of the hearing aid types mentioned above, however, unlike traditional hearing aids, OTC hearing aids are not necessarily fitted by a HCP but can be fitted by the user him-/herself, usually through an application or a computer-implemented program. In general, but particularly for OTC hearing aids, the reference image may be a generic image, photo, or drawing showing a hearing aid of the relevant model correctly arranged on a model or a replica of a human head.

For example, the hearing device may be a headset, such as an earbud, in-ear headphones, on-ear headphones, or over-ear headphones.

The application is configured for capturing the first image with the camera. Thus, the application may be configured for capturing the first image with the camera application. The first image shows at least the ear of the wearer with the hearing device arranged in and/or at the ear of the wearer. The first image shows a first position, such as a current or actual position, of the hearing device arranged in and/or at the ear of the wearer. Thus, the first image may show how the hearing device is currently, such as at the moment, arranged in and/or at the ear. If this is not showed in an image captured by the camera, the application may provide instructions to adjust the placement or position of the camera and/or the placement or position of the wearer's head/ear, and thereby the relative distance or angle between the camera and the wearer's head/ear, such that the features of the hearing device arranged in and/or at the ear can be seen in the viewfinder of the camera application, such that these features can be captured in a first image. The first image may be captured by input from the user, such as manual shutter control. The first image may be captured by timed or automatic shutter control. The first image may be captured using any kind of image recognition software that recognizes when to capture the first image, such as when the ear and the hearing device arranged in and/or at the ear are in a proper or right position for the camera or camera application to capture the first image.

The application is configured for enabling a comparison between the first image and a reference image, wherein the comparison is of a first position of the hearing device arranged in and/or at the ear of the wearer in the first image relative to a reference position of the hearing device arranged in and/or at the ear of the wearer in the reference image. The reference position may be defined or determined by for example a HCP, as discussed above. The comparison between the first image and the reference image may be a side-by-side comparison. The comparison between the first image and the reference image may be a comparison where the first image and the reference image are overlaid on each other, for example such that the first image is displayed transparent or translucent on top of the reference image, or vice versa. The application may determine or calculate how well the first image compares, fits or matches to the reference image, such as calculating a degree of correlation, association, fit or match between the first image and the reference image. Thus, the application may compare the first image to the reference image and determine if the first image is a good fit or match to the reference image and/or determine how well the first image corresponds to the reference image. For example, the application may determine whether the hearing device in the first image is arranged in the same position in and/or at the ear, as the hearing device in the reference image, such as whether a specific part of the hearing device, such as the housing, the tube, the receiver-in-ear, etc. is arranged in the same position in and/or at the ear in the first image and in the reference image.

In some embodiments, the application is configured for providing a first visual guide in the viewfinder, the first visual guide is for assisting the wearer in obtaining a first predetermined placement of his/her head and/or ear relative to the camera, when capturing the first image. The first visual guide may provide visual instructions or guidance to the hearing device wearer to reduce or increase a distance between the wearer's head, face or ear and the camera. The first visual guide may provide visual instructions or guidance to the hearing device wearer to turn his/her head. The first visual guide may provide visual instructions or guidance to the hearing device wearer to adjust his/her head position, such as turn the head, rotate the head, move the head in a lateral direction, move the head in a transverse direction, and/or move the head in a vertical direction relative to the camera. The first predetermined placement of the wearer's head and/or ear may be a correct placement, such as optimal or best placement, of the wearer's head and/or ear, such that the head and/or ear is placed in a correct placement, position or alignment relative to the camera for capturing the first image. The first predetermined placement may be the placement where the wearer's head and/or ear is in focus. The first predetermined placement may be the placement where the wearer's head and/or ear may be centered, or approximately centered, on the preview of the first image in the viewfinder.

In some embodiments, the first visual guide is overlaid on the preview of the first image in the viewfinder. The first visual guide may be a transparent overlay on the preview of the first image in the viewfinder.

In some embodiments, the first visual guide includes a shape of an outline of a human head. The first visual guide may be a grey head outline. The first visual guide may be a silhouette of a human head, e.g. also silhouette of neck and shoulders. The first visual guide may be shown using a dashed or dotted line. The first visual guide may include the shape of an circle or oval, roughly tracing the outline of a human head.

In some embodiments, the comparison between the first image and the reference image is performed automatically using image recognition functionalities, method or software. The image recognition functionalities, methods or software, such as computer vision, may use machine learning, neural networks or artificial intelligence for the comparison. The comparison may be performed locally, such as within the application or on the electronic device. The comparison may be performed remotely, such as in a server or cloud. Additionally or alternatively, the comparison may be performed by a person, such as a visual comparison performed by the hearing device wearer.

In some embodiments, the image recognition functionalities, methods, or software utilise image landmarks or features identified, determined or detected on the first image and/or on the reference image. The image landmarks or features may be landmarks or features such as a point, distance, angle, edge, pixel by pixel, and/or gradient. The image landmarks or features may be a location or an area of the image of interest, such as highlighted by the HCP to pay attention to, e.g. where a receiver tube goes over the top of the pinna and/or the orientation of the receiver itself prior to insertion in or at the ear. The image landmarks or features may be identified by the HCP or the image landmarks or features may be identified by image recognition functionalities, methods or software, such as computer vision. The image recognition functionalities, methods or software may use machine learning, neural networks and/or artificial intelligence for the identification of image landmarks or features. It is an advantage to use image landmarks or features in the comparison between the first image and the reference image, as this may decrease the computing time and/or power for the comparison.

In some embodiments, the application is configured for providing suggestions or instructions to the wearer for assisting the wearer in adjusting the position of the hearing device arranged in and/or at the ear based on the comparison between the first image and the reference image. Thus, if the comparison between the first image and the reference image shows, determines or recognizes that the hearing device is incorrectly arranged, such as not correctly arranged, in and/or at the ear, the application may provide appropriate suggestions or instructions for guiding the wearer to perform the necessary adjustments to the hearing device to be able to obtain or achieve correct arrangement. Thus, if the comparison for example shows that a hearing device placed on the ear is placed too much towards the front side of head or face compared to the reference position in the reference image, the suggestions or instructions may be directed toward arranging the hearing device on the ear more towards the back of the head. If the comparison for example shows that a hearing device placed in or at the ear canal is rotated compared to the reference position in the reference image, the suggestions or instructions may be directed toward rotating the hearing device clockwise or counter-clockwise, such as rotating a certain amount of degrees. If the comparison for example shows that a hearing device, which is configured to be placed in and/or at the right ear, is placed in and/or at the left ear, the suggestions or instructions may be directed toward changing the hearing device, such that the hearing device intended for the right ear is arranged in and/or at the right ear. The suggestions or instructions may comprise information regarding whether or not the hearing device is correctly arranged in and/or at the ear, such as an indication that the hearing device is correctly or in-correctly arranged in and/or at the ear of the hearing device wearer. The suggestions or instructions, such as the appropriate suggestions or instructions, for assisting the wearer in adjusting the position of the hearing device arranged in and/or at the ear, may be determined using artificial intelligence or machine learning functionalities, methods, software or algorithms.

In some embodiments, the application is configured for receiving a second input for initiating capturing of the reference image, wherein the reference image shows a reference position of the hearing device arranged in and/or at the ear of the wearer. The application is configured for providing access to the camera application associated with the camera of the electronic device. The application is configured for enabling the viewfinder of the camera application to provide a preview of the reference image. The application is configured for capturing the reference image with the camera.

The second input may be a user input, such as a user providing the second input to the application. The user may provide the second input via an input device, such as a touch-sensitive surface or a keyboard. The second input may be a contact or a gesture on a touch-sensitive surface, such as a stylus and/or finger contact and/or gesture on a touch-sensitive surface. For example, the second input may be a tapping or swiping contact and/or gesture on a touch-sensitive surface. The second input may be a voice input, such as a human language voice input, such as a vocal or spoken input.

The reference image may be captured before the first image is captured. The reference image may be captured by a HCP, the hearing device wearer himself/herself, or another person such as a family member or a friend helping the hearing device wearer. The reference image may be captured immediately after the reference position of the hearing device arranged in and/or at the ear of the wearer has been determined or defined. The reference image may be captured an amount of time after the reference position of the hearing device arranged in and/or at the ear of the wearer has been determined or defined. A preview of the reference image, such as a live preview image or live image feed of the reference image may be provided before capturing the reference image, such as to show or display what the reference image will look like before the reference image is captured.

The reference image may be captured by input from the HCP, the hearing device wearer himself/herself, or another person, such as manual shutter control. The reference image may be captured by timed or automatic shutter control. The reference image may be captured using any kind of image recognition software that recognizes or determines when to capture the reference image, such as when the ear, and/or the hearing device arranged in and/or at the ear, is/are in a proper or right position for the camera or camera application to capture the reference image.

In some embodiments, the reference image is provided to the application from an external source. The reference image may be captured using a separate application, electronic device and/or camera. The reference image may be provided to the application from an external source, such as a server, a cloud service, via a wired or wireless connection, such as via email or SMS.

In some embodiments, the application is configured for providing a second visual guide in the viewfinder, the second visual guide is for assisting a user in obtaining a second predetermined placement of the head and/or ear of the wearer relative to the camera, when capturing the reference image.

The second visual guide may provide visual instructions or guidance to the user to change the placement or position or alignment of the wearer's head and/or ear relative to the camera. For example, the second visual guide may provide visual instructions or guidance to the user to reduce or increase a distance between the wearer's head, face or ear and the camera, or to change the position of the camera relative to the wearer's head and/or ear, such as move the camera in a lateral direction, move the camera in a transverse direction, and/or move the head in a camera direction relative to the wearer's head and/or ear. If the user is the hearing device wearer, the second visual guide may provide visual instructions or guidance to the hearing device wearer to adjust his/her head position, such as turn the head, rotate the head, move the head in a lateral direction, move the head in a transverse direction, and/or move the head in a vertical direction relative to the camera. The second predetermined placement of the wearer's head and/or ear may be a correct, optimal or best placement of the wearer's head and/or ear, such that the head and/or ear is placed in a correct, optimal or best placement, position or alignment relative to the camera for capturing the reference image. The second predetermined placement may be the placement where the wearer's head and/or ear is/are in focus. The second predetermined placement may be the placement where the wearer's head and/or ear may be centered, or approximately centered, on the preview of the reference image in the viewfinder. The second predetermined placement of the head and/or ear of the wearer may be the same as the first predetermined placement of the head and/or ear of the wearer.

In some embodiments, the second visual guide is overlaid on the preview of the reference image in the viewfinder. The second visual guide may be a transparent overlay on the preview of the reference image in the viewfinder.

In some embodiments, the second visual guide includes a shape of an outline of a human ear. The second visual guide may be a grey ear outline. The second visual guide may be a silhouette of a human ear. The second visual guide may a silhouette of a human head, e.g. also silhouette of neck and shoulders, and an ear. The second visual guide may be shown using a dashed or dotted line. The second visual guide may include the shape of a circle or oval, roughly tracing the outline of a human ear.

In some embodiments, the application is configured for tracking the position and/or movement of the head and/or ear of the wearer. The application may be configured for tracking the head and/or ear by using the camera to locate the head and/or ear over time in image frames, use an algorithm to analyze the image frames and output the movement of the head and/or ear between the image frames. Tracking the head and/or ear may be performed using image recognition functionalities, methods or software, such as computer vision. Tracking the head and/or ear may be performed using machine learning, neural networks or artificial intelligence. Tracking the head and/or ear may be performed using depth-sensing or scanning techniques, such as using a time-of-flight sensor to create a 3D map of the scene beyond an image.

In some embodiments, the application is configured for providing instructions and/or feedback for assisting the user and/or hearing device wearer, in using the application.

The instructions and/or feedback may be instructions on how to use application, instructions to guide the user, such as the hearing device wearer, while using the application, feedback to guide the user, such as the hearing device wearer, while using the application such as indicating a correct or incorrect input, movement or gesture. The instructions and/or feedback may be provided as a response to tracking the position and/or movement of the head and/or ear of the wearer. The instructions and/or feedback may be provided for assisting the hearing device wearer in achieving or obtaining correct placement of head and/or ear relative to the camera, such as e.g. instructions for the wearer to turn the head in front of the camera, instructions to increase or decrease distance to camera, feedback when the head and/or ear is/are turned the right or wrong way. The instructions and/or feedback may be provided for obtaining the first image and/or the reference image.

In some embodiments, the suggestions, instructions and/or feedback comprise audio, visual and/or haptic suggestions, instructions and/or feedback. Thus, the suggestions, instructions and/or feedback may be audio suggestions, instructions and/or feedback, such as spoken words or sounds outputted via a loudspeaker in the electronic device. The suggestions, instructions and/or feedback may be visual suggestions, instructions and/or feedback, such as text or symbols in black-and-white and/or in colour displayed on the screen or display of the electronic device, or changes in the light intensity of the screen or display of the electronic device. The suggestions, instructions and/or feedback may be haptic suggestions, instructions and/or feedback, such as a tactile output, such as vibrations of the electronic device, provided by haptic or tactile output generators. The suggestions, instructions and/or feedback may be any combination of the above described types of suggestions, instructions and/or feedback.

In some embodiments, the user is the hearing device wearer and/or a hearing care professional, audiologist or other person. It is envisioned that a person other than the hearing device wearer, preferably a hearing care professional (HCP), captures the reference image, e.g. in a clinic. However, for some reason the hearing device wearer may not have access to a HCP for capturing the reference image. Thus, the user may be the hearing device wearer himself/herself, or for example a family member or a friend of the hearing device wearer. It is an advantage that the user may be the hearing device wearer, such that the hearing device wearer may be able to capture the reference image herself/himself, such that the application enables assistance to the wearer, assistance that may be readily available to the wearer without the need for another person to assist. This may for example be the case when a hearing device wearer has received confirmation from a HCP that the hearing device is correctly arranged in and/or at the ear of the wearer, but the HCP does not have the opportunity to capture a reference image. It is an advantage that the user may be another person, such that hearing device wearers who are unable to capture the reference image on their own may receive help from e.g. a friend or family member, such that the wearer does not need to visit a HCP to receive help. This may for example be the case where a spouse can confirm that the hearing device is correctly arranged in and/or at the ear of the wearer and the spouse is also assisting in capturing a reference image. It is an advantage that the user may be a HCP, such that the reference image may be captured by the HCP immediately after hearing device settings have been performed, such that the wearer can use the application to achieve correct arrangement of the hearing device according to a reference position as defined according to the best hearing device settings as defined or determined by the HCP.

The present disclosure relates to different aspects including the application described above and in the following, and corresponding applications, systems, methods, devices, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

A digital assistance for assisting a wearer of a hearing device to correctly arrange the hearing device with respect to an ear of the wearer, includes: a control configured to enable a preview of a first image to be displayed, wherein the first image is generated by a camera; wherein the control is also configured to enable a capturing of the first image, the first image showing at least the ear of the wearer with the hearing device arranged in and/or at the ear of the wearer; and wherein the digital assistance also comprises a comparator configured to perform a comparison between (1) the first image showing the at least the ear of the wearer with the hearing device and (2) a reference image.

Optionally, the comparator is configured to compare (1) a first position of the hearing device relative to the ear of the wearer in the first image and (2) a reference position of the hearing device with respect to the ear of the wearer in the reference image.

Optionally, the digital assistance is configured to provide a visual guide in a display, the visual guide configured to assist the wearer to achieve a desired relative positioning between (1) a head and/or the ear and (2) the camera, when capturing the first image.

Optionally, the digital assistance is configured to overlay the first visual guide on the preview of the first image.

Optionally, the first visual guide includes a shape of an outline of a human head.

Optionally, the comparator is configured to use an image recognition function to perform the comparison between the first image and the reference image.

Optionally, the image recognition functionality is configured to utilize image landmarks in the first image and/or in the reference image.

Optionally, the digital assistance is configured to provide a suggestion and/or an instruction to the wearer to assist the wearer in adjusting a position of the hearing device relative to the ear based on the comparison between the first image and the reference image.

Optionally, the digital assistance is configured to receive the reference image from an external source.

Optionally, the control is configured to enable the preview of the first image to be displayed, and to enable the capturing of the first image, in response to an input indicating a desire to obtain the first image.

Optionally, the control is also configured to enable a preview of the reference image to be displayed, wherein the reference image is generated by the camera; and wherein the control is also configured to enable a capturing of the reference image.

Optionally, the control is configured to enable the reference image to be displayed, and to enable the capturing of the reference image, in response to an input indicating a desire to obtain the reference image.

Optionally, the digital assistance is configured to provide a visual guide in a display, the visual guide configured to assist a user or the wearer to achieve a desired relative positioning between (1) a head and/or the ear and (2) the camera, when capturing the reference image Optionally, the user is a hearing care professional, an audiologist, or other person.

Optionally, the digital assistance is configured to overlay the visual guide on the preview of the reference image.

Optionally, the visual guide includes a shape of an outline of a human ear.

Optionally, the digital assistance further includes a tracker configured to track a position and/or a movement of a head and/or the ear of the wearer.

Optionally, the digital assistance further includes a feedback generator configured to provide instruction and/or feedback to assist a user and/or the wearer in using the digital assistance.

Optionally, the suggestion and/or feedback comprises audio suggestion and/or audio feedback, visual suggestion and/or visual feedback, and/or haptic suggestion and/or haptic feedback.

Optionally, the digital assistance is implemented in the electronic device.

Optionally, the electronic device comprises a cell phone.

Optionally, the digital assistance comprises an application in the electronic device.

An electronic device includes the digital assistance, and the camera.

A non-transitory processor-readable medium comprises a set of instructions for implementing the digital assistance.

Other features, advantageous, and embodiments will be described in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
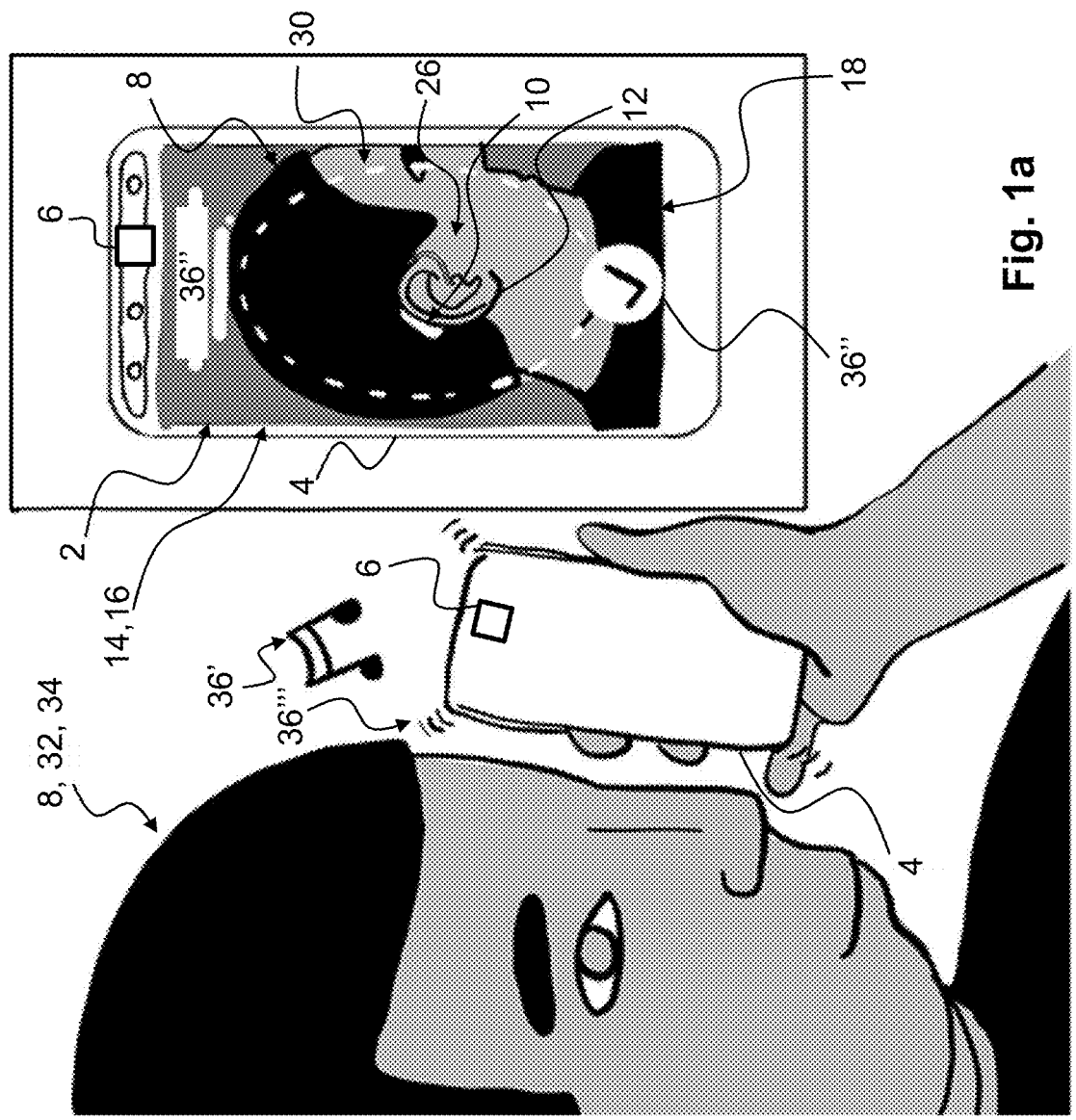
FIG. 1a schematically illustrates an exemplary application to be executed on an electronic device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1a schematically illustrates an exemplary application (2) to be executed on an electronic device (4) and use of the application (2). A detailed view of the electronic device (4) is illustrated in a box in the top right corner of the figure.

The application (2) is configured to be executed by an electronic device (4) having a camera (6). The application (2) is for assisting a wearer (8) of a hearing device (10) in correctly arranging the hearing device (10) in and/or at an ear (12) of the wearer (8). The application (2) is configured for receiving a first input for initiating the application (2) to provide assistance to the wearer (8) in correctly arranging the hearing device (10) in and/or at the ear (12) of the wearer (8). The application (2) is configured for providing access to a camera application (14) associated with the camera (6) of the electronic device (4). The application (2) is configured for enabling a viewfinder (16) of the camera application (14) to provide a preview (18) of a first image. The application (2) is configured for capturing the first image (see FIG. 1b) with the camera (6), the first image showing at least the ear (12) of the wearer (8) with the hearing device (10) arranged in and/or at the ear (12). The application (2) is configured for enabling a comparison (see FIG. 1b) between the first image and a reference image, wherein the comparison is of a first, current, or actual position (26) of the hearing device (10) arranged in and/or at the ear (12) of the wearer (8) in the first image relative to a reference position of the hearing device (10) arranged in and/or at the ear (12) of the wearer (8) in the reference image.

The application (2) is configured for providing a first visual guide (30) in the viewfinder (16). The first visual guide (30) is for assisting the wearer (8) in obtaining a first predetermined placement (32) of his/her head (34) and/or ear (12) relative to the camera (6), when capturing the first image.

The first visual guide (30) is overlaid on the preview (18) of the first image in the viewfinder (16). The first visual guide (30) is illustrated with a dashed line.

The first visual guide (30) includes a shape of an outline of a human head.

The first visual guide (30) may provide visual instructions or guidance to the hearing device wearer (8) to adjust the placement, position or alignment of the wearer's head (34) and/or ear (12) and/or the camera (6) to obtain the first predetermined placement (32) of the wearer's head (34) and/or ear (12), such that the head (34) and/or ear (12) is placed in a correct, optimal or best placement, position or alignment relative to the camera (6) for capturing the first image.

As illustrated in FIG. 1a, the first predetermined placement (32) may be the placement where the wearer's ear (12) appears to be centered, or approximately centered, on the preview (18) of the first image in the viewfinder (16).

The application (2) may be configured for tracking the position and/or movement of the head (34) and/or ear (12) of the wearer (8).

The application (2) is configured for providing instructions (36) and/or feedback (36) for assisting a user, such as the hearing device wearer (8), in using the application (2).

The instructions (36) and/or feedback (36) may be instructions (36) on how to use the application (2), instructions (36) to guide the hearing device wearer (8) while using the application (2), or feedback (36) to guide the hearing device wearer (8) such as indicating an correct or incorrect input, movement or gesture. The instructions (36) and/or feedback (36) may be provided as a response to tracking the position and/or movement of the head (34) and/or ear (12) of the wearer (8). The instructions (36) and/or feedback (36) may be provided for assisting the hearing device wearer (8) in obtaining the first predetermined placement (32) of the wearer's head (34) and/or ear (12), such as e.g. instructions for the wearer (8) to turn his/her head (34) relative to the camera (6), instructions (36) to increase or decrease distance to the camera (6), feedback (36) when the head (34) and/or ear (12) is turned the right or wrong way relative to the camera (6).

The instructions (36) and/or feedback (36) may comprise audio, visual and/or haptic instructions (36) and/or feedback (36). FIG. 1a illustrates that the instructions (36) and/or feedback (36) may comprise sounds or music (36'), text or symbols (36") displayed on the screen or display of the electronic device (4) and/or haptic signal or vibrations (36''') of the electronic device (4).

Figure 1B:
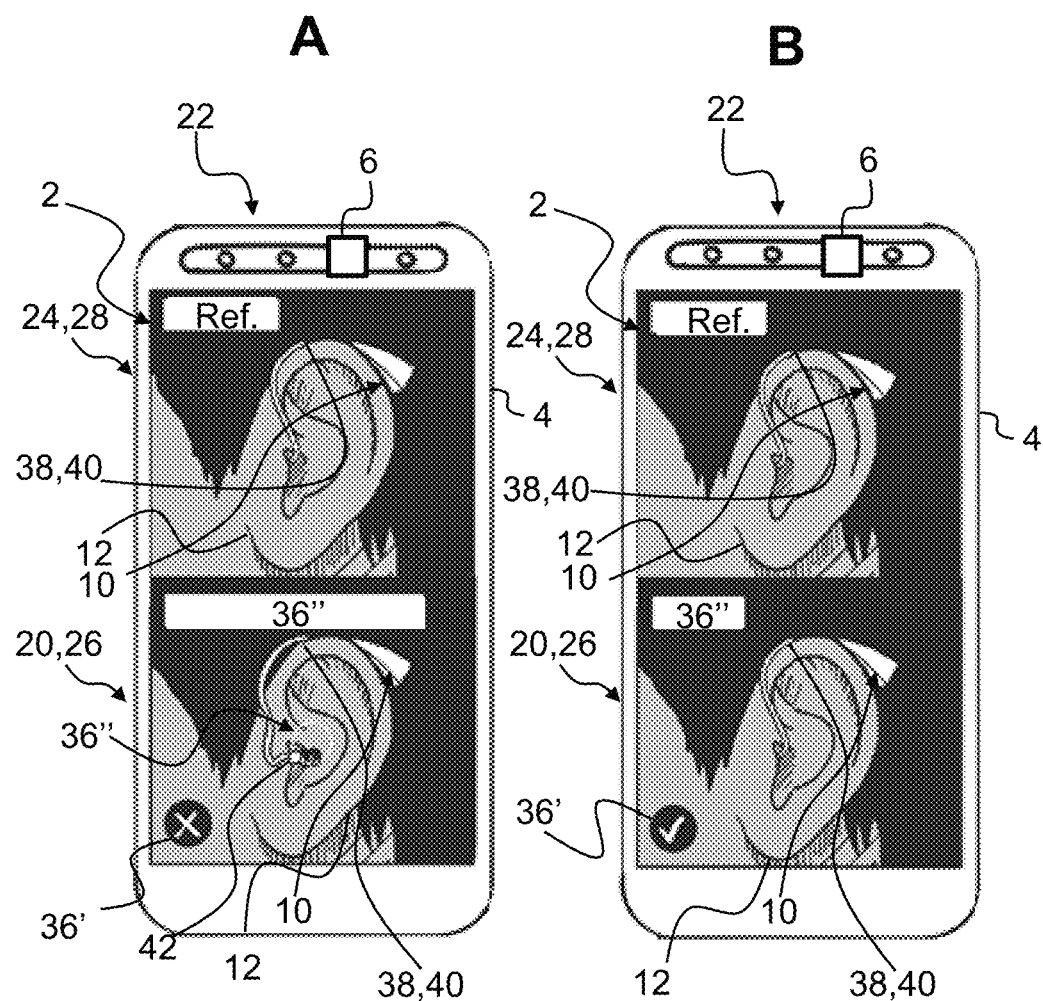
FIG. 1b schematically illustrates an exemplary application to be executed on an electronic device.

FIG. 1b schematically illustrates an exemplary application (2) to be executed on an electronic device (4) and use of the application (2). FIG. 1b shows two different instances, A and B, of the application (2).

The application (2) is configured to be executed by an electronic device (4) having a camera (6). The application (2) is for assisting a wearer of a hearing device (10) in correctly arranging the hearing device (10) in and/or at an ear (12) of the wearer. The application (2) is configured for receiving a first input for initiating the application (2) to provide assistance to the wearer in correctly arranging the hearing device (10) in and/or at the ear (12) of the wearer. The application (2) is configured for providing access to a camera application associated with the camera (6) of the electronic device (4). The application (2) is configured for (see FIG. 1a.) enabling a viewfinder of the camera application to provide a preview of a first image. The application (2) is configured for capturing the first image (20) with the camera (6), the first image (20) showing at least the ear (12) of the wearer with the hearing device (10) arranged in and/or at the ear (12). The application (2) is configured for enabling a comparison (22) between the first image (20) and the reference image (24), wherein the comparison (22) is of a first, current or actual position (26) of the hearing device (10) arranged in and/or at the ear (12) of the wearer in the first image (20) relative to a reference position (28) of the hearing device (10) arranged in and/or at the ear (12) of the wearer (8) in the reference image (24). In some embodiments, the application (2) may include a comparator configured to perform the comparison between the first image 92) and the reference image (24).

FIG. 1b shows the comparison (22) between the first image (20) and the reference image (24) where the reference image (24) is displayed above or on top of the first image (20). Alternatively, the reference image (24) and the first image (20) may be displayed side-by-side, or displayed such that the first image (20) is overlaid on the reference image (24). In FIG. 1b the comparison (22) is displayed such that the hearing device wearer can perform a visual comparison (22) between the first image (20) and the reference image (24). Furthermore, the application may perform a comparison (22). The comparison (22) between the first image (20) and the reference image (24) may be performed automatically using image recognition functionalities, methods or software. The image recognition functionalities, methods or software may utilise image landmarks (38) identified, determined or detected on the first image (20) and/or on the reference image (24). The image landmarks (38) may be landmarks or features such as a point, distance, angle, edge, pixel by pixel, gradient or it may be a location or an area of the image of interest. In FIG. 1b, image landmarks (38) are illustrated as an area or location (40) where a receiver tube goes over the top of the pinna of the ear (12). FIG. 1b illustrates one image landmark (38) in each of the first image (20) and reference image (24), however there may be identified or determined several image landmarks (38) in each of the first image (20) and reference image (24).

The application (2) is configured for providing suggestions and/or instructions (36) to the wearer (8) for assisting the wearer (8) in adjusting the position of the hearing device (10) arranged in and/or at the ear (12) based on the comparison (22) between the first image (20) and the reference image (24). FIG. 1b. illustrates that, in instance A, the comparison (22) between the first image (20) and the reference image (24) shows, determines or recognizes that the hearing device (10) is incorrectly arranged, such as not correctly arranged, in and/or at the ear (12), because a receiver (42) is not correctly inserted in the ear (12). The application (2) may provide the appropriate suggestions and/or instructions (36) for guiding the wearer (8) to perform the necessary adjustments to the hearing device (10) to be able to obtain or achieve correct arrangement of the hearing device (10) in and/or at the ear (12). Additionally, the suggestions and/or instructions (36) may comprise information regarding whether or not the hearing device is correctly arranged in and/or at the ear. Thus, in FIG. 1b, instance A, the application (2) provides visual suggestions/ instructions (36') to indicate that the hearing device is incorrectly arranged in and/or at the ear (the X in the left lower corner of the first image (20)). Furthermore, the application (2) provides visual suggestions and/or instructions (36") for assisting or guiding the wearer (8) to correctly insert the receiver (42) in the ear (12). The visual instructions (36") are in this example illustrated i) by a white bar in the top of the first image (20), the white bar may comprise captions and ii) by a white dotted circle around the element, in this case the receiver (42), which is not correctly arranged and which position should be adjusted. Alternatively or additionally, the suggestions and/or instructions (36) may comprise audio, and/or haptic suggestions and/or instructions (36). After the application (2) has provided a comparison (22) of the first position (26) in the first image (20) with the reference position (28) in the reference image (24), and provided the appropriate suggestions and/or instructions (36) on how to adjust the hearing device, the wearer (8) may adjust the hearing device (10) in and/or at the ear (12). After the hearing device (10) has been adjusted, the application (2) may be used again, for a new comparison (22) between a new first position (20) in a new first image (20) and the reference position (28) in the reference image (24). After the hearing device (10) has been adjusted in and/or at the ear (12), or if the hearing device (10) was initially correctly arranged in and/or at the ear (12), the comparison may for example look like FIG. 1b, instance B. FIG. 1b illustrates that, in instance B, the comparison (22) shows, determines or recognizes that the hearing device (10) is correctly arranged in and/or at the ear (12) of the wearer (8), as indicated with visual suggestions and/or instructions (36') in the form of a check mark in the lower left corner of the first image (20) and suggestions and/or instructions (36") shown at the upper left corner of the first image (20).

Figure 2:
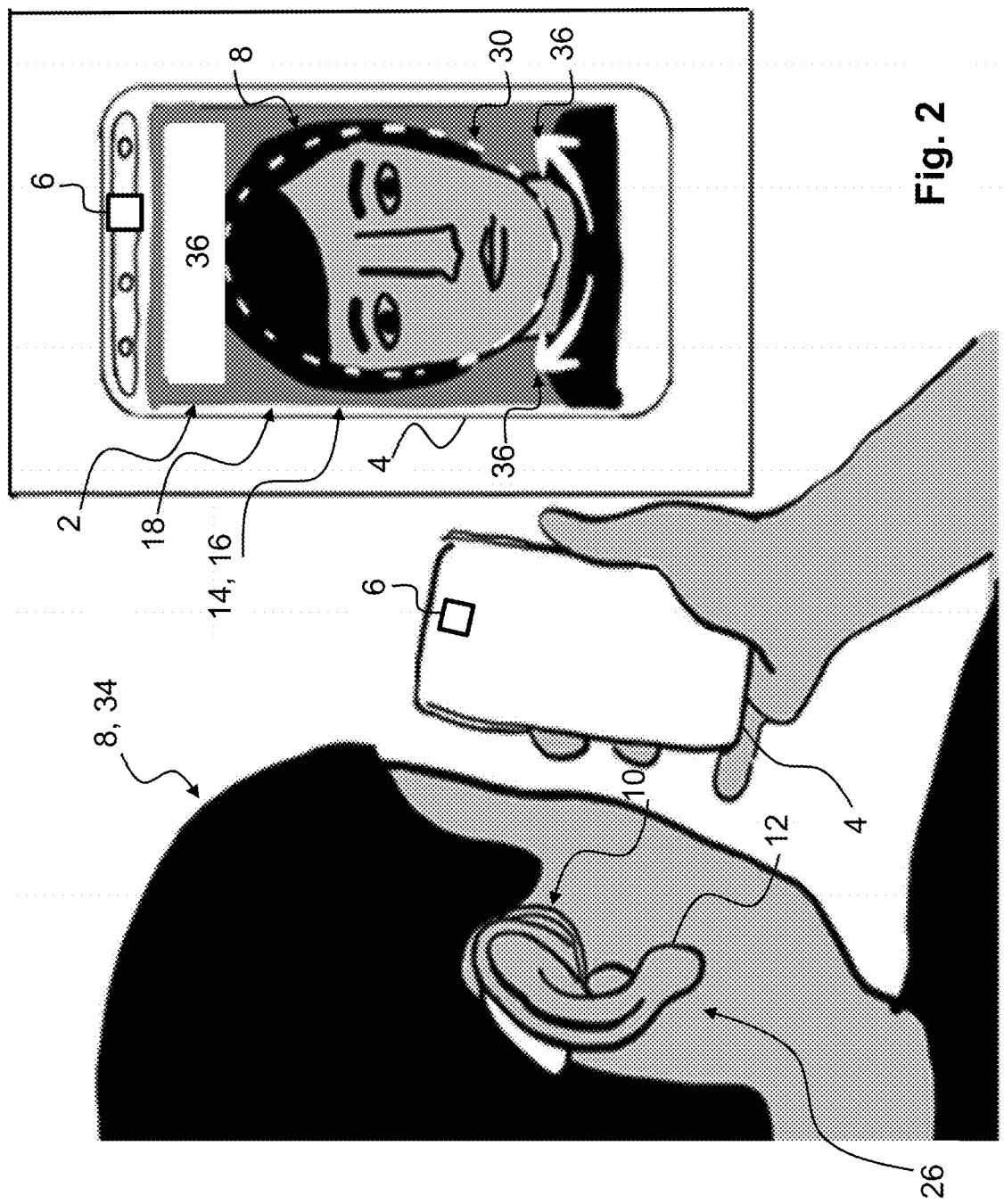
FIG. 2 schematically illustrates an exemplary application to be executed on an electronic device.

FIG. 2 schematically illustrates an exemplary application (2) to be executed on an electronic device (4) and use of the application (2). A detailed version of the electronic device (4) is illustrated in a box. FIG. 2 schematically illustrates use of the application (2) which may occur prior to FIG. 1a.

The application (2) is to be executed by an electronic device (4) having a camera (6). The application (2) is for assisting a wearer (8) of a hearing device (10) in correctly arranging the hearing device (10) in and/or at an ear (12) of the wearer (8). The application (2) is configured for receiving a first input for initiating the application (2) to provide assistance to the wearer (8) in correctly arranging the hearing device (10) in and/or at the ear (12) of the wearer (8). The application (2) is configured for providing access to a camera application (14) associated with the camera (6) of the electronic device (4). The application (2) is configured for enabling a viewfinder (16) of the camera application (14) to provide a preview (18) of a first image. The application (2) is configured for capturing the first image (see FIG. 1b) with the camera (6), the first image showing at least the ear (12) of the wearer (8) with the hearing device (10) arranged in and/or at the ear (12). The application (2) is configured for enabling a comparison (see FIG. 1b) between the first image and a reference image, wherein the comparison is of a first, current or actual position (26) of the hearing device (10) arranged in and/or at the ear (12) of the wearer (8) in the first image relative to a reference position of the hearing device (10) arranged in and/or at the ear (12) of the wearer (8) in the reference image.

The application (2) is configured for providing a first visual guide (30) in the viewfinder (16), the first visual guide (30) is for assisting the wearer (8) in obtaining a first predetermined placement of his/her head (34) and/or ear (12) relative to the camera (6), when capturing the first image.

A first predetermined placement of the wearer's head and/or ear is illustrated in FIG. 1a.

The first visual guide (30) is illustrated with a dashed line, as shown in the box in the upper right corner of FIG. 2.

The first visual guide (30) is overlaid on the preview (18) of the first image in the viewfinder (16).

The first visual guide (30) includes a shape of an outline of a human head.

The first visual guide (30) provides visual instructions or guidance to the hearing device wearer (8) to adjust the placement, position or alignment of the wearer's head (34) and/or ear (12) and the camera (6) to obtain the first predetermined placement of the wearer's head (34) and/or ear (12), such that the head (34) and/or ear (12) is placed in a correct, optimal or best placement, position or alignment relative to the camera (6) for capturing the first image. For example, if the wearer's head (34) is placed too high or too low relative to the camera (6), the first visual guide (30) provides visual instructions and/or guidance to adjust the position of the head (43) and/or camera (6), such that the wearer's head (34) will obtain the first predetermined placement of the wearer's head (34) as illustrated in FIG. 1a.

The application (2) may be configured for tracking the position and/or movement of the head (34) and/or ear (12) of the wearer (8).

The application (2) is configured for providing instructions (36) and/or feedback (36) for assisting a user and/or hearing device wearer (8) in using the application (2).

The instructions (36) and/or feedback (36) may be instructions (36) on how to use the application (2), instructions (36) to guide the user, such as the hearing device wearer (8) while using the application (2), or feedback (36) to guide the user and/or hearing device wearer (8) such as indicating a correct or incorrect input, movement or gesture. The instructions (36) and/or feedback (36) may be provided as a response to tracking the position and/or movement of the head (34) and/or ear (12) of the wearer (8). The instructions (36) and/or feedback (36) may be provided for assisting the hearing device wearer (8) in obtaining the first predetermined placement (see FIG. 1a) of the wearer's head (34) and/or ear (12), such as e.g. instructions for the wearer (8) to turn his/her head (34) relative to the camera (6), instructions (36) to increase or decrease distance to the camera (6), feedback (36) when the head (34) and/or ear (12) is turned the right or wrong way relative to the camera (6). FIG. 2 illustrates the instructions (36) and/or feedback (36) as visual instructions (36) for the wearer to turn his head to the side in order to achieve the predetermined position of the head (34) as illustrated in FIG. 1a.

Figure 3:
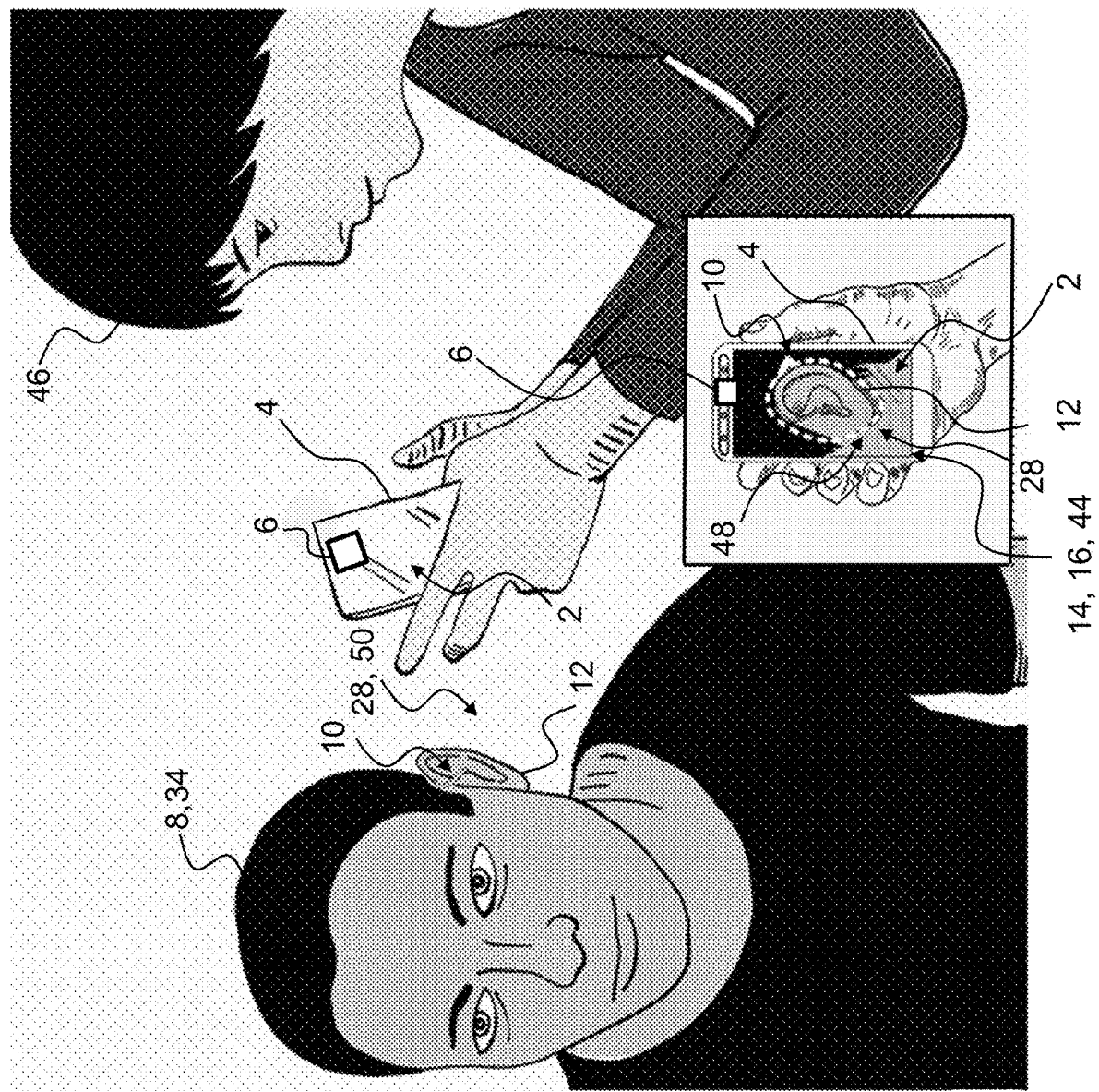
FIG. 3 schematically illustrates an exemplary application to be executed on an electronic device.

FIG. 3 schematically illustrates an exemplary application (2) to be executed on an electronic device (4) and use of the application (2). FIG. 3 may illustrate the capturing of the reference image.

The application (2) is configured for receiving a second input for initiating capturing of the reference image, wherein the reference image shows a reference position (28) of the hearing device (10) arranged in and/or at the ear (12) of the wearer (8). The application (2) is configured for providing access to the camera application (14) associated with the camera (6) of the electronic device (4). The application (2) is configured for enabling the viewfinder (16) of the camera application (14) to provide a preview (44) of the reference image. The application (2) is configured for capturing the reference image with the camera (4).

An example of a reference image is shown in FIG. 1b.

The box in the bottom of FIG. 3 shows the viewfinder (16) of the camera application (14) providing a preview (44) of the reference image.

The reference image may be captured before the first image is captured. The reference image may be captured by a user (46) of the application (2). The user (46) may be the hearing device wearer or the user (46) may be a hearing care professional, audiologist or other person, as illustrated in FIG. 3.

The reference image may be captured using the application (2). Alternatively, the reference image may be provided to the application (2) from an external source.

The application is configured for providing a second visual guide (48) in the viewfinder (16), the second visual guide (48) is for assisting a user (46) in obtaining a second predetermined placement (50) of the head (34) and/or ear (12) of the wearer (8) relative to the camera (6), when capturing the reference image. The box in the bottom of FIG. 3 shows the viewfinder (16), where the second visual guide (48) can be seen.

The second visual guide (48) is overlaid on the preview (44) of the reference image in the viewfinder (16). The second visual guide (48) includes a shape of an outline of a human ear.

As illustrated in FIG. 3, the second predetermined placement (50) may be the placement where the wearer's ear (12) appears to be centered, or approximately centered, on the preview (44) of the reference image in the viewfinder (16). The second predetermined placement (50) may be the same as first predetermined placement.

A first predetermined placement is shown in 1a.

The application (2) may be configured for providing instructions and/or feedback (not shown) for assisting the user (46) and/or hearing device wearer (8) in using the application (2). The instructions and/or feedback may be provided for assisting the user (46) and/or hearing device wearer (8) in obtaining the second predetermined placement (50) of the wearer's head (34) and/or ear (12) relative to the camera (6).

Figure 4:
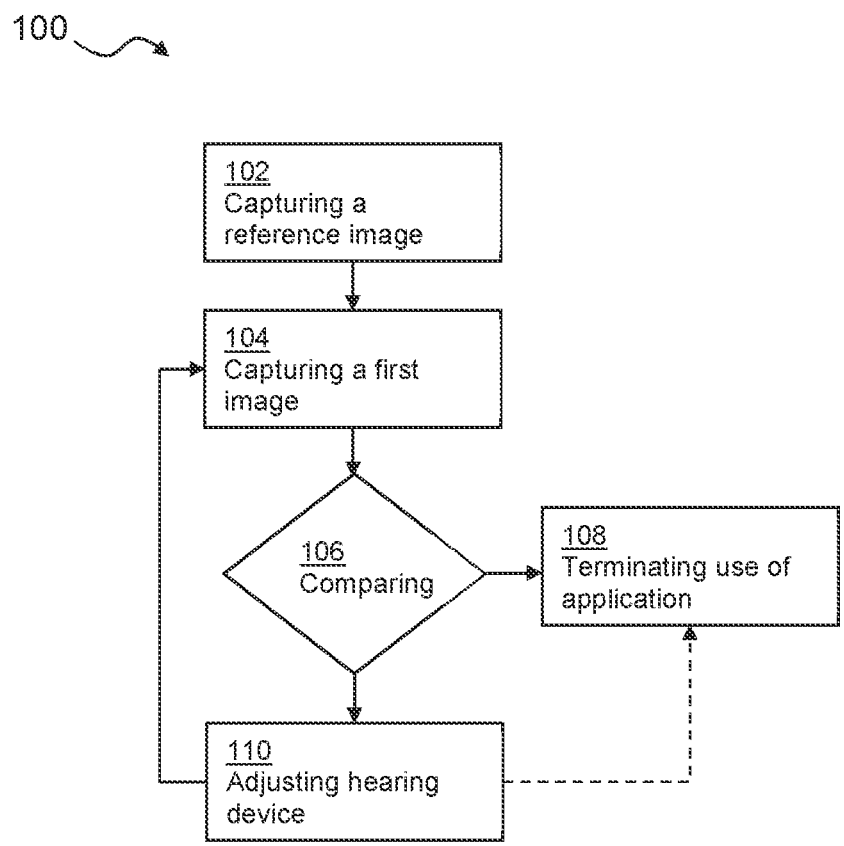
FIG. 4 shows a flow diagram, illustrating the overall flow of use of an exemplary application.

FIG. 4 shows a flow diagram, illustrating the overall flow (100) of use of an exemplary application for assisting a hearing device wearer in correctly arranging a hearing device in and/or at an ear of the wearer. In step 102 a reference image is captured. The reference image shows a correct placement or arrangement of the hearing device in and/or at the ear of the hearing device wearer. The reference image may be captured using the application. Alternatively, the reference image may be provided to the application from an external source. The reference image may be captured at any time before a first image is captured (104).

In step 104 a first image is captured. The application is used to capture a first image, where the first image shows a current placement or arrangement of the hearing device in and/or at the ear of the wearer.

In step 106 a comparison is performed. The application is used to perform a comparison between the first image and the reference image. If the comparison shows that the hearing device is correctly arranged, then the flow continues to step 108. If the comparison shows that the hearing device is not correctly arranged, then the flow continues to step 110.

In step 108 the use of the application may be terminated, if the comparison (106) of the first image and the reference image shows that the hearing device is correctly arranged in and/or at the ear of the wearer.

In step 110 the hearing device is adjusted, if the comparison in step (106) of the first image and the reference image shows that the hearing device is not correctly arranged in and/or at the ear of the wearer. The application provides suggestions and/or instructions for assisting in adjusting the position of the hearing device. The suggestions and/or instructions are based on the comparison (106) between the first image and the reference image. After the hearing device has been adjusted, the flow may be iterated or repeated by using the application to capture a new first image in step (104) and perform a comparison in step (106) between the new first image and the reference image. Alternatively, the use of the application may be terminated (108).

It should be noted that the application (2) described herein may be considered to be an example of a digital assistance for assisting a wearer of a hearing device to correctly arrange the hearing device with respect to an ear of the wearer. In some embodiments, the digital assistance may include a control configured to enable a preview of a first image (generated by the camera (6)) to be displayed, and to enable a capturing of the first image (showing at least the ear of the wearer with the hearing device arranged in and/or at the ear of the wearer). The control may be configured to directly or indirectly control the camera (6) and/or one or more functionalities associated with the camera (6). In some cases, the control may be configured to interact with a camera application associated with the camera (6) of the electronic device (4), and operate the camera (6) through the camera application. In other embodiments, the digital assistance may be considered to be a module or a component in an electronic device. Also, in some embodiments, the digital assistant may be implemented using a processing unit, wherein the processing unit may include hardware, software, or combination of both. Accordingly, one or more components (e.g., control, comparator, etc.) of the digital assistance may include hardware, software, or both. In some cases, the processing unit may be a processing circuit, such as a processor. Furthermore, in other embodiments, the digital assistance may be an application with instructions for execution by a processor of an electronic device. In some cases, the instructions of the application may be stored in a non-transitory processor-readable medium. The processor-readable medium may be a storage unit in the electronic device, or may be a server. In the embodiment in which the medium is a server, instructions of the application may be transmitted to an electronic device, such as a cell phone, in a downloading process.

The following items are exemplary features of embodiments described herein. Each item may be an embodiment itself or may be a part of an embodiment. One or more items described below may be combined with other item(s) in an embodiment.

Item 1: A digital assistance for assisting a wearer of a hearing device to correctly arrange the hearing device with respect to an ear of the wearer, includes: a control configured to enable a preview of a first image to be displayed, wherein the first image is generated by a camera; wherein the control is also configured to enable a capturing of the first image, the first image showing at least the ear of the wearer with the hearing device arranged in and/or at the ear of the wearer; and wherein the digital assistance also comprises a comparator configured to perform a comparison between (1) the first image showing the at least the ear of the wearer with the hearing device and (2) a reference image.

Item 2: In the digital assistance, the comparator is configured to compare (1) a first position of the hearing device relative to the ear of the wearer in the first image and (2) a reference position of the hearing device with respect to the ear of the wearer in the reference image.

Item 3: The digital assistance is configured to provide a visual guide in a display, the visual guide configured to assist the wearer to achieve a desired relative positioning between (1) a head and/or the ear and (2) the camera, when capturing the first image.

Item 4: The digital assistance is configured to overlay the first visual guide on the preview of the first image.

Item 5: The first visual guide includes a shape of an outline of a human head.

Item 6: The comparator is configured to use an image recognition function to perform the comparison between the first image and the reference image.

Item 7: The image recognition functionality is configured to utilize image landmarks in the first image and/or in the reference image.

Item 8: The digital assistance is configured to provide a suggestion and/or an instruction to the wearer to assist the wearer in adjusting a position of the hearing device relative to the ear based on the comparison between the first image and the reference image.

Item 9: The digital assistance is configured to receive the reference image from an external source.

Item 10: The control is configured to enable the preview of the first image to be displayed, and to enable the capturing of the first image, in response to an input indicating a desire to obtain the first image.

Item 11: The control is also configured to enable a preview of the reference image to be displayed, wherein the reference image is generated by the camera; and wherein the control is also configured to enable a capturing of the reference image.

Item 12: The control is configured to enable the reference image to be displayed, and to enable the capturing of the reference image, in response to an input indicating a desire to obtain the reference image.

Item 13: The digital assistance is configured to provide a visual guide in a display, the visual guide configured to assist a user or the wearer to achieve a desired relative positioning between (1) a head and/or the ear and (2) the camera, when capturing the reference image Item 14: The user is a hearing care professional, an audiologist, or other person.

Item 15: The digital assistance is configured to overlay the visual guide on the preview of the reference image.

Item 16: The visual guide includes a shape of an outline of a human ear.

Item 17: The digital assistance further includes a tracker configured to track a position and/or a movement of a head and/or the ear of the wearer.

Item 18: The digital assistance further includes a feedback generator configured to provide instruction and/or feedback to assist a user and/or the wearer in using the digital assistance.

Item 19: The suggestion and/or feedback comprises audio suggestion and/or audio feedback, visual suggestion and/or visual feedback, and/or haptic suggestion and/or haptic feedback.

Item 20: The digital assistance is implemented in the electronic device.

Item 21: The electronic device comprises a cell phone.

Item 22: The digital assistance comprises an application in the electronic device.

Item 23: An electronic device includes the digital assistance, and the camera.

Item 24: A non-transitory processor-readable medium comprises a set of instructions for implementing the digital assistance.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 application
4 electronic device
6 camera
8 wearer of a hearing device
10 hearing device
12 ear of the wearer
14 camera application
16 viewfinder of the camera application
18 preview of the first image
20 first image
22 comparison
24 reference image
26 first, current or actual position
28 reference position
30 first visual guide
32 first predetermined placement 34 head of the wearer
36 instructions and/or feedback
38 image landmarks or features
40 area or location where a receiver tube goes over top of the pinna of the ear
42 receiver
44 preview of the reference image
46 user
48 second visual guide
50 second predetermined placement
100 method
102 capturing a reference image
104 capturing a first image
106 performing comparison
108 terminating use of application
110 adjusting hearing device

The invention claimed is:

1. A digital assistance for assisting a wearer of a hearing device to correctly arrange the hearing device with respect to an ear of the wearer, comprising:
a control configured to enable a preview of a first image to be displayed, wherein the first image is generated by a camera;
wherein the control is also configured to enable a capturing of the first image, the first image showing at least the ear of the wearer with the hearing device arranged in and/or at the ear of the wearer;
wherein the digital assistance is implemented in an electronic device that comprises the camera for generating the first image, wherein the digital assistance implemented in the electronic device comprises a comparator configured to perform a comparison between (1) the first image showing the at least the ear of the wearer with the hearing device and (2) a reference image, to determine whether the hearing device is correctly arranged with respect to the ear of the wearer;
wherein the digital assistance comprises hardware, or a combination of software and the hardware;
wherein the reference image comprises a hearing device image and an ear image, and indicates a correct position of the hearing device image with respect to the ear image, wherein the reference image is either a right-side view or a left-side view of a head;
wherein the digital assistance is configured to inform the wearer whether the hearing device is correctly arranged with respect to the ear of the wearer based on the comparison performed by the comparator of the digital assistance; and
wherein the comparator in the electronic device is configured to perform the comparison by calculating a degree of correlation between (1) the first image showing the at least the ear of the wearer with the hearing device, and (2) the reference image having the ear image and the hearing device image.

2. The digital assistance of claim 1, wherein first image indicates a first position of the hearing device relative to the ear of the wearer, and wherein the reference image indicates a target position for the hearing device to be achieved relative to the ear of the wearer.

3. The digital assistance of claim 1, wherein the digital assistance is configured to provide a visual guide in a display, the visual guide configured to assist the wearer to achieve a desired relative positioning between (1) the ear and (2) the camera, when capturing the first image.

4. The digital assistance of claim 3, wherein the digital assistance is configured to overlay the first visual guide on the preview of the first image.

5. The digital assistance of claim 4, wherein the first visual guide includes a shape of a head-outline.

6. The digital assistance of claim 1, wherein the comparator is configured to use an image recognition functionality to perform the comparison between the first image and the reference image.

7. The digital assistance of claim 6, wherein the image recognition functionality is configured to utilize image landmarks in the first image and/or in the reference image.

8. The digital assistance of claim 1, wherein the digital assistance is configured to provide a suggestion and/or an instruction to the wearer to assist the wearer in adjusting a position of the hearing device relative to the ear in a certain direction based on the comparison between the first image and the reference image.

9. The digital assistance of claim 1, wherein the digital assistance is configured to receive the reference image from an external source.

10. The digital assistance of claim 1, wherein the control is configured to enable the preview of the first image to be displayed, and to enable the capturing of the first image, in response to an input indicating a desire to obtain the first image.

11. The digital assistance of claim 1, wherein the control is also configured to enable a preview of the reference image to be displayed, wherein the reference image is generated by the camera; and
wherein the control is also configured to enable a capturing of the reference image.

12. The digital assistance of claim 11, wherein the control is configured to enable the reference image to be displayed, and to enable the capturing of the reference image, in response to an input indicating a desire to obtain the reference image.

13. The digital assistance of claim 11, wherein the digital assistance is configured to provide a visual guide in a display, the visual guide configured to assist a user or the wearer to achieve a desired relative positioning between (1) a head and/or the ear and (2) the camera, when capturing the reference image.

14. The digital assistance of claim 13, wherein the user is a hearing care professional, an audiologist, or other person.

15. The digital assistance of claim 13, wherein the digital assistance is configured to overlay the visual guide on the preview of the reference image.

16. The digital assistance of claim 13, wherein the visual guide includes a shape of an outline of a human ear.

17. The digital assistance of claim 1, further comprising a tracker configured to track a position and/or a head-movement and/or an ear-movement of the wearer.

18. The digital assistance of claim 1, further comprising a feedback generator configured to provide instruction and/or feedback to assist a user and/or the wearer to adjust a position of the hearing device relative to the ear of the wearer.

19. The digital assistance of claim 18, wherein the suggestion and/or feedback comprises audio suggestion and/or audio feedback, visual suggestion and/or visual feedback, and/or haptic suggestion and/or haptic feedback.

20. The digital assistance of claim 1, wherein the electronic device comprises a cell phone.

21. The digital assistance of claim 1, wherein the digital assistance comprises an application in the electronic device.

22. An electronic device comprising the digital assistance of claim 1, and the camera.

23. A non-transitory processor-readable medium storing a set of instructions for implementing the digital assistance of claim 1.

24. The digital assistance of claim 1, wherein the comparator is configured to perform the comparison to determine whether the hearing device is correctly arranged with respect to the ear of the wearer by determining whether the hearing device is positioned with respect to the ear of the wearer in a manner indicated in the reference image.

25. The digital assistance of claim 1, wherein the hearing device image is an image of the hearing device, and the ear image is an image of the ear.

26. The digital assistance of claim 1, wherein the ear image of the reference image comprises an image of the ear of the wearer, and wherein the comparator of the digital assistance is configured to perform the comparison between (1) the first image showing the at least the ear of the wearer with the hearing device and (2) the reference image comprising the image of the ear of the wearer.

27. The digital assistance of claim 1, wherein the comparator in the electronic device is configured to overlaid the first image and the reference image with respect each other.

28. The digital assistance of claim 1, wherein the comparator in the electronic device is configured to display a transparent version of the first image over the reference image, or to display a transparent version of the reference image over the first image.

29. The digital assistance of claim 1, wherein the comparator in the electronic device is configured to display the first image and the reference image in a side-by-side configuration.

30. The digital assistance of claim 29, wherein the side-by-side configuration allows a user or the wearer to manually compare the first image with the reference image.

31. The digital assistance of claim 1, wherein the comparator in the electronic device is configured to perform the comparison using a non-machine learning algorithm.

32. The digital assistance of claim 1, wherein the comparator is configured to obtain (1) the first image showing the at least the ear of the wearer with the hearing device and (2) the reference image having the ear image and the hearing device image, as respective inputs.

\* \* \* \* \*